(12) United States Patent
Ogasawara et al.

(10) Patent No.: US 7,921,975 B2
(45) Date of Patent: Apr. 12, 2011

(54) HYDRAULIC CLUTCH DEVICE

(75) Inventors: Atsushi Ogasawara, Saitama (JP); Yoshinki Tsukada, Saitama (JP); Junya Watanabe, Saitama (JP); Takashi Ozeki, Saitama (JP); Shigeru Tajima, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 12/109,070

(22) Filed: Apr. 24, 2008

(65) Prior Publication Data
US 2008/0264754 A1 Oct. 30, 2008

(30) Foreign Application Priority Data

Apr. 27, 2007 (JP) ................ 2007-119609

(51) Int. Cl.
*F16D 25/0638* (2006.01)
(52) U.S. Cl. ............. 192/85.25; 192/85.41; 192/48.611; 192/70.12; 192/106 F; 192/113.34
(58) Field of Classification Search ........... 192/85.25, 192/85.41, 48.611
See application file for complete search history.

(56) References Cited

U.S. PATENT DOCUMENTS

| 3,823,802 | A | * | 7/1974 | Winzeler et al. | ........... 192/106 F |
| 6,059,682 | A | * | 5/2000 | Friedmann et al. | ........... 475/159 |
| 6,929,107 | B2 | * | 8/2005 | Hegerath | ............ 192/48.611 |
| 6,935,480 | B2 | * | 8/2005 | Ziemer | ............ 192/70.12 |
| 6,945,371 | B2 | * | 9/2005 | Schmidt | ............ 188/71.6 |

FOREIGN PATENT DOCUMENTS

JP 7-42761 A 2/1995

* cited by examiner

*Primary Examiner* — Richard M. Lorence
*Assistant Examiner* — Jacob S. Scott
(74) *Attorney, Agent, or Firm* — Birch, Stewart, Kolasch & Birch, LLP

(57) ABSTRACT

A clutch actuation mechanism having a plurality of friction plates engaged with a clutch outer and a clutch inner in a relatively non-rotatable manner and arranged alternately between a bearing plate portion and a pressing plate portion. A clutch disengage/engage control mechanism for switching disengagement/engagement of the clutch actuation mechanism. A clutch piston having opposite sides facing toward a control hydraulic chamber and a hydraulic canceler chamber. A division wall member forming the hydraulic canceler chamber between the division wall member and the clutch piston for forming an oil passage, which introduces lubricating oil toward the friction plates, in cooperation with the clutch inner. A control hydraulic chamber, hydraulic canceler chamber, and division wall member are arranged within a range corresponding to the space between the outer surfaces of a bearing plate portion and pressing plate portion and radially inward of a clutch actuation mechanism.

20 Claims, 5 Drawing Sheets

HYDRAULIC CLUTCH DEVICE

CROSS-REFERENCE TO RELATED APPLICATIONS

The present application claims priority under 35 USC 119 to Japanese Patent Application No. 2007-119609 filed on Apr. 27, 2007 the entire contents of which are hereby incorporated by reference.

BACKGROUND OF TIE INVENTION

1. Field of the Invention

The present invention relates to a hydraulic clutch device including a clutch actuation mechanism having a clutch outer, a clutch inner coaxially surrounded by the clutch outer, a plurality of first friction plates engaged with the clutch outer in a relatively non-rotatable manner, a plurality of second friction plates that are arranged so as to alternately overlap with the first friction plates and engaged with the clutch inner in a relatively non-rotatable manner, a bearing plate portion that is fixed to one of the clutch inner and the clutch outer so as to be opposed to the first and second friction plates arranged in a mutually overlapping manner, and a pressing plate portion that sandwiches the first and second friction plates with the bearing plate portion. A clutch disengage/engage control mechanism is provided for switching disengagement/engagement of the clutch actuation mechanism. The clutch disengage/engage control mechanism includes a clutch piston whose opposite sides are faced toward a control hydraulic chamber and a hydraulic canceler chamber and which is connected to the pressing plate portion so as to move to a side for pressing the first and second friction plates in accordance with an increase in hydraulic pressure of the control hydraulic chamber, and a division wall member that forms the hydraulic canceler chamber between the division wall member and the clutch piston and forms an oil passage, which introduces lubricating oil toward the first and second friction plates, in cooperation with the clutch inner.

2. Description of Background Art

A hydraulic clutch device is disclosed in, for example, JP-A No. H7-42761.

However, in JP-A No. H7-42761 the control hydraulic chamber, hydraulic canceler chamber, and division wall of a clutch disengage/engage control mechanism are arranged axially outward with respect to a plurality of alternately overlapping friction plates in a clutch actuation mechanism, causing an increase in the axial size of the hydraulic clutch device, which in turn leads to an increase in the size of a power unit having the hydraulic clutch device.

SUMMARY AND OBJECTS OF THE INVENTION

The present invention has been made in view of the above-mentioned problems. In is an object of an embodiment of the present invention to provide a hydraulic clutch device that is reduced in axial size.

To achieve the above-mentioned object according to an embodiment of the present invention, there is provided a hydraulic clutch device including a clutch actuation mechanism having a clutch outer, a clutch inner coaxially surrounded by the clutch outer, a plurality of first friction plates engaged with the clutch outer in a relatively non-rotatable manner, a plurality of second friction plates that are arranged so as to alternately overlap with the first friction plates and that are engaged with the clutch inner in a relatively non-rotatable manner, a bearing plate portion that is fixed to one of the clutch inner and the clutch outer so as to be opposed to the first and second friction plates arranged in a mutually overlapping manner. A pressing plate portion is provided that sandwiches the first and second friction plates with the bearing plate portion. A clutch disengage/engage control mechanism is provided for switching disengagement/engagement of the clutch actuation mechanism. The clutch disengage/engage control mechanism includes a clutch piston whose opposite sides are faced toward a control hydraulic chamber and a hydraulic canceler chamber and which is connected to the pressing plate portion so as to move to a side for pressing the first and second friction plates in accordance with an increase in hydraulic pressure of the control hydraulic chamber. A division wall member is provided that forms the hydraulic canceler chamber between the division wall member and the clutch piston and forms an oil passage, which introduces lubricating oil toward the first and second friction plates, in cooperation with the clutch inner. The control hydraulic chamber, the hydraulic canceler chamber, and the division wall member of the clutch disengage/engage control mechanism are arranged within a range corresponding to a space between outer surfaces of the bearing plate portion and the pressing plate portion and radially inward of the clutch actuation mechanism.

According to an embodiment of the present invention, the control hydraulic chamber, the hydraulic canceler chamber, and the division wall member are arranged within a range of the clutch actuation mechanism corresponding to a space between opposite axial ends of the plurality of first and second friction plates (85, 110; 86, 111) arranged in a mutually overlapping manner.

According to an embodiment of the present invention, a return spring exerts a spring force on the clutch piston in a direction for actuating the clutch actuation mechanism to a disengagement side, and presses the division wall member onto the clutch inner. The return spring is accommodated in the hydraulic canceler chamber and is provided between the clutch piston and the division wall member.

According to an embodiment of the present invention, a support tube portion that extends axially is integrally provided in the division wall member so as to support the clutch piston in a liquid-tight and slidable manner.

According to an embodiment of the present invention, an orifice is interposed in the oil passage.

According to an embodiment of the present invention, a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

According to an embodiment of the present invention, the branch wall extends from the inner periphery of the division wall member with its distal end located radially inward with respect to the clutch piston.

It should be noted that a first driving friction plate 85 and a second driving friction plate 110 according to an embodiment correspond to the first friction plate according to the present invention. In addition, a first driven friction plate 86 and a second driven friction plate 111 according to an embodiment correspond to the second friction plate according to the present invention.

According to an embodiment of the present invention, the control hydraulic chamber, hydraulic canceler chamber, and division wall member of the clutch disengage/engage control mechanism are arranged within a range corresponding to a space between outer surfaces of the bearing plate portion and the pressing plate portion in the clutch actuation mechanism and are radially inward of the clutch actuation mechanism. Therefore, by arranging a large portion of the clutch disengage/engage control mechanism radially inward of the clutch actuation mechanism, the axial size of the hydraulic clutch device can be reduced.

According to an embodiment of the present invention, the control hydraulic chamber; the hydraulic canceler chamber, and the division wall member are arranged within a range corresponding to a space between opposite axial ends of the plurality of alternately overlapping fist and second function plates of the clutch actuation mechanism, thereby making it possible to achieve a further reduction in the axial size of the hydraulic clutch device.

According to an embodiment of the present invention, the division wall member can be substantially fixed to the clutch inner as the division wall member is pressed onto the clutch inner by the return spring. It is thus possible to reduce the number of parts by obviating a dedicated member for fixing the division wall member to the clutch inner, which in turn contributes to a reduction in the size of the hydraulic clutch device.

According to an embodiment of the present invention, the clutch piston is slidably supported by the support tube portion provided to the division wall member. Therefore, even when a sufficiently large sliding area of the clutch piston with the support tube portion is secured to provide sufficient support for the clutch piston, since the division wall member is arranged within a range corresponding to a space between the opposite axial ends of the clutch actuation mechanism and radially inward of the clutch actuation mechanism, it is possible to suppress an increase in the axial size of the hydraulic clutch device.

According to an embodiment of the present invention, due to the orifice interposed in the oil passage, it is possible to prevent an excessive amount of lubricating oil from being introduced toward the first and section friction plates thereby introducing an appropriate amount of lubricating oil toward the first and section friction plates.

According to an embodiment of the present invention, it is possible to reduce the number of machining processes by causing lubricating oil to be commonly supplied to the hydraulic canceler chamber and to the oil passage, while positively allowing the lubricating oil to flow toward the oil passage by means of the branch wall.

According to an embodiment of the present invention, since the distal end of the branch wall is located radially inward with respect to the inner periphery of the clutch piston, lubricating oil can be diverted toward the oil passage at a position not susceptible to the influence of the sliding operation of the clutch piston.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, a mode for carrying out the present invention will be described on the basis of an embodiment of the present invention illustrated in the accompanying drawings.

Figure 1:
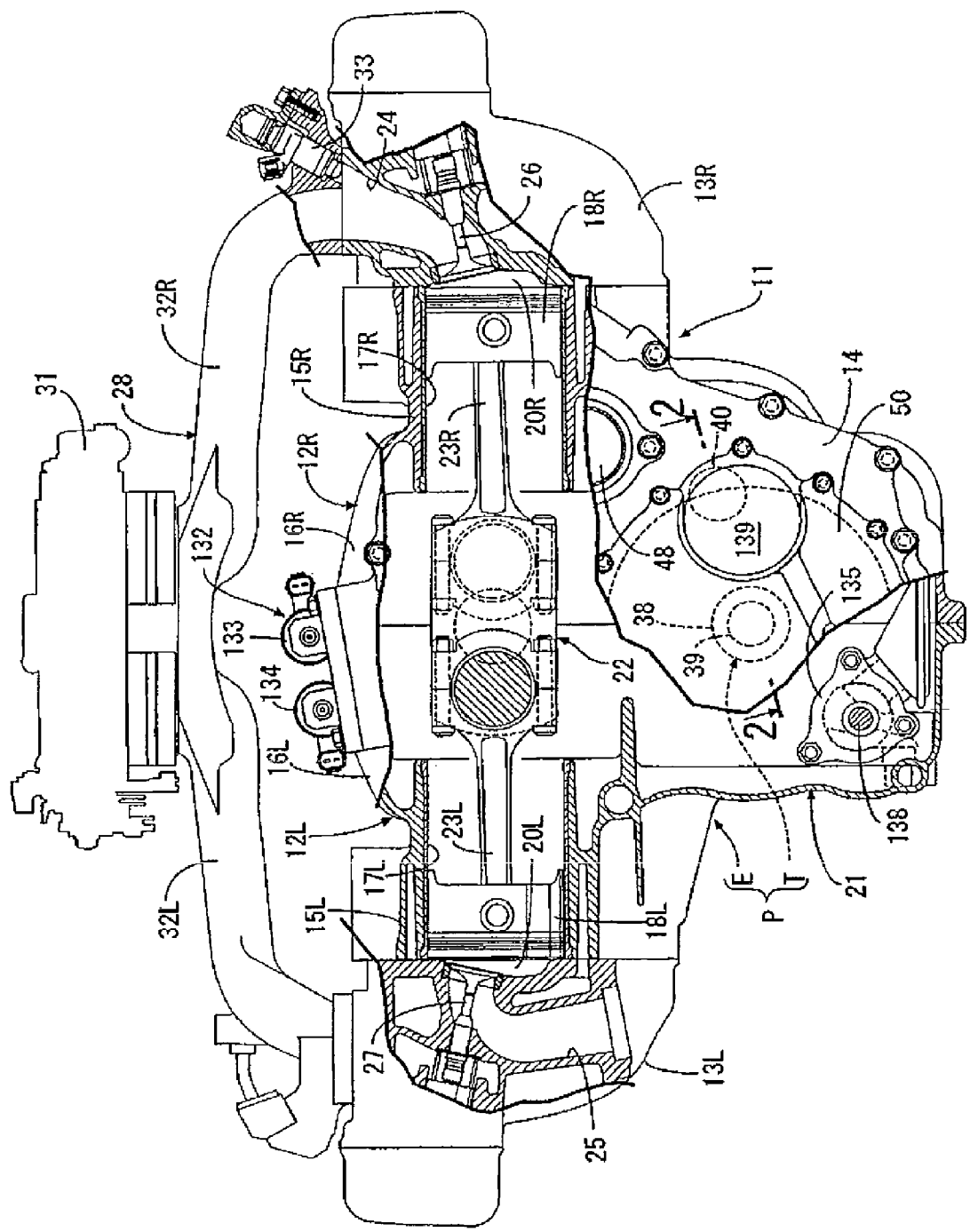
FIG. 1 is a partially cut-away rear view of a power unit.

First, in FIG. 1, a power unit P mounted in, for example, a motorcycle includes a multi-cylinder horizontally-opposed type engine E as a 4-cycle engine, and a transmission T for changing the speed of the power of the engine E. An engine body 11 of the engine E includes a left engine block 12L that is arranged on the left side as seen while facing forward in the travel direction of the motorcycle, a right engine block 12R that is arranged on the right side as seen while facing forward in the travel direction of the motorcycle, left and right cylinder heads 13L, 13R that are respectively coupled to the outer ends of both the left and right engine blocks 12L, 12R, and a rear case 14 coupled to the left and right engine blocks 12L, 12R.

The right engine block 12L includes a left cylinder block 15L having a plurality of cylinder bores 17L provided in parallel, and a left crankcase portion 16L that is formed integrally with the left cylinder block 15L. The left cylinder head 13L is coupled to the left cylinder block 15L so as to form combustion chambers 20L between it and pistons 18L that are slidably fitted in the cylinder bores 17L. Further, the right engine block 12R includes a right cylinder block 15R having a plurality of cylinder bores 17R provided in parallel, and a right crankcase portion 16R that is formed integrally with the right cylinder block 15R. The right cylinder head 13R is coupled to the right cylinder block 15R so as to form combustion chambers 20R between it and pistons 18R that are slidably fitted in the cylinder bores 17R.

The engine blocks 12L, 12R are arranged so as to be opposed to each other with the axes of the cylinder bores 17L, 17R oriented substantially horizontally. The left and right crankcase portions 16L, 16R are coupled to each other so as to form a crankcase 21 in cooperation with each other. The rear case 14 is coupled to the rear portion of the crankcase 21 along the travel direction of the motorcycle.

The respective pistons 18L, 18R of the engine blocks 12L, 12R are commonly joined to a crankshaft 22, whose one end side is arranged on the forward side along the longitudinal direction of the motorcycle and whose axis is oriented along the longitudinal direction of the motorcycle, via connecting rods 23L and 23R. The crankshaft 22 is rotatably supported on the crankcase 21.

Intake ports 24 that can communicate with the respective combustion chambers 20L, 20R are provided in the upper side walls of the left and right cylinder heads 13L, 13R. Exhaust ports 25 that can communicate with the respective combustion chambers 20L, 20R are provided in the lower side walls of the left and right cylinder heads 13L, 13R. Intake valves 26 for opening and closing the respective intake ports 24, and exhaust valves 27 for opening and closing the respective exhaust ports 25 are disposed in the left and right cylinder heads 13L, 13R so as to be capable of opening and closing.

An intake system 28 is connected to the upper side walls of the left and right cylinder heads 13L, 13R so as to communicate with the intake ports 24. The intake system 28 includes a throttle body 31 arranged above the left and right cylinder blocks 15L, 15R, and a plurality of intake pipes 32L, 32R connecting between the throttle body 31 and the left and right cylinder heads 13L, 13R.

Figure 2:
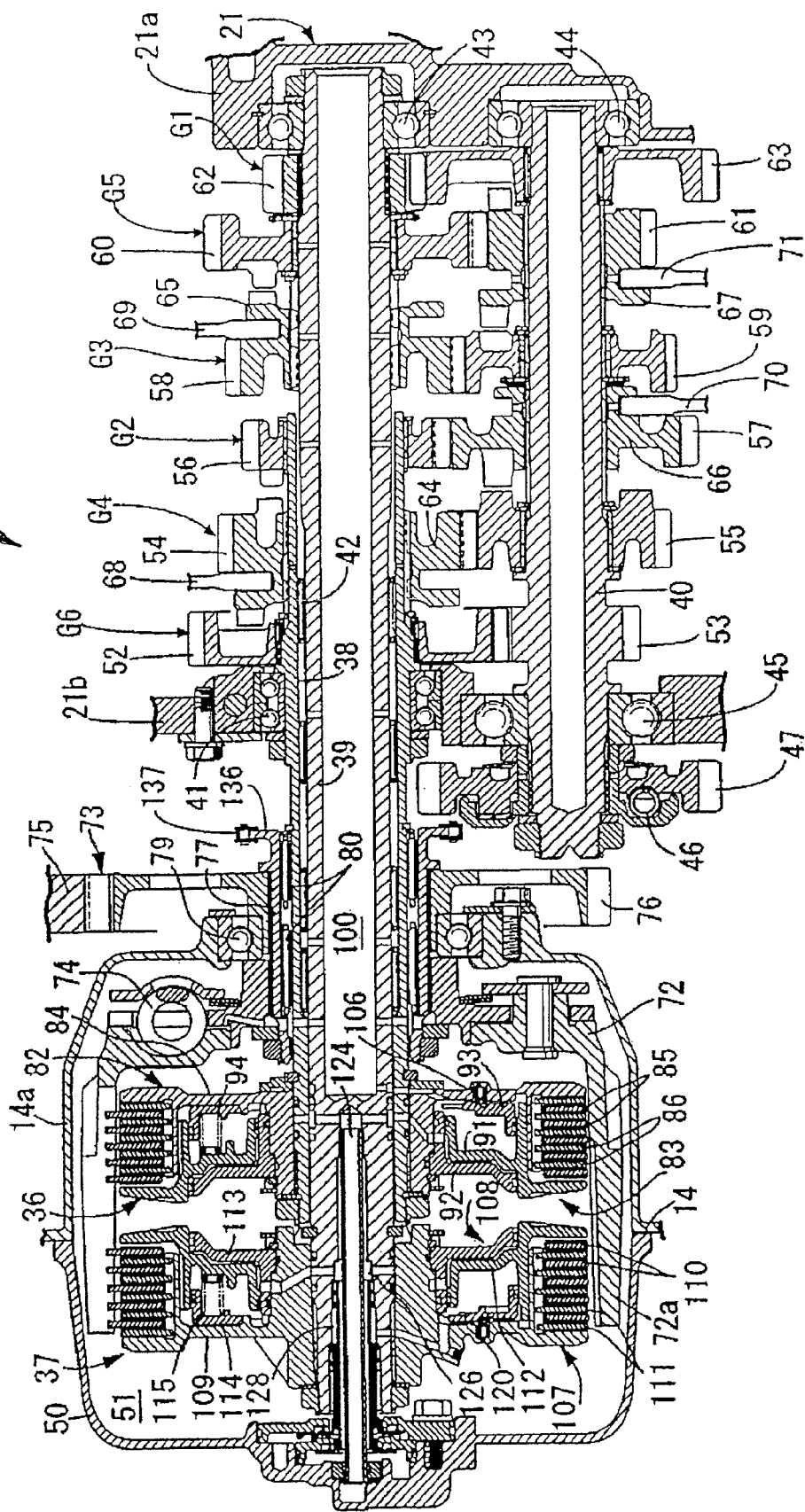
FIG. 2 is a sectional view taken along the line 2-2 of FIG. 1.

In FIG. 2, the transmission T includes a gear change mechanism 35, and first and second hydraulic clutch devices 36, 37 provided between the gear change mechanism 35 and the crankshaft 22. The first and second hydraulic clutch devices 36, 37 are interposed in a power transmission path for transmitting the rotational power of the crankshaft 22 to a rear wheel (not shown).

The gear change mechanism 35 is accommodated in the crankcase 21 while having a plurality of speed gear trains that can be selectively established, for example, first to sixth gear trains G1, G2, G3, G4, G5, G6. The gear change mechanism 35 has the second, fourth, and sixth gear trains G2, G4, G6 provided between a first main shaft 38 and a countershaft 40, and the first, third, and fifth gear trains G1, G3, G5 provided between a second main shaft 39, which passes through the first main shaft 38 coaxially and in a relatively rotatable manner, and the crankshaft 40.

The crankcase 21 includes a pair of front and rear side walls 21a, 21b that are opposed to each other at a spacing in the direction along the axis of the crankshaft 22, that is, in the longitudinal direction of the motorcycle. The intermediate portion of the first main shaft 38, which is formed in a cylindrical shape while having an axis parallel to the crankshaft 22 and whose one end is arranged in the intermediate portion between the front and rear side walls 21a, 21b of the crankcase 21, passes through the rear side wall 21b in a rotatable manner. A ball bearing 41 is interposed between the rear side wall 21b and the first main shaft 38. Further, the second main shaft 39 having an axis parallel to the crankshaft 22 passes through the first main shaft 38 in a relatively rotatable manner with its axial position kept constant relative to the first main shaft 38. A plurality of needle bearings 42 are interposed between the first main shaft 38 and the second main shaft 39. One end of the second main shaft 39 is rotatably supported on the front side wall 21a of the crankcase 21 via a ball bearing 43.

One end of the countershaft 40 having an axis parallel to the crankshaft 22 is rotatably supported on the front side wall 21a via a ball bearing 44. The other end of the countershaft 40 passes through the rear side wall 21b in a rotatable manner with a ball bearing 45 interposed between the other end of the countershaft 40 and the rear side wall 21b. A gear 47 is attached via a damper spring 46 to the projecting end of the countershaft 40 from the rear side wall 21b.

A drive shaft 48 (see FIG. 1) having an axis parallel to the countershaft 40 extends rearward while rotatably passing through the rear case 14 so as to transmit power toward the rear wheel (not shown). A gear transmission mechanism including the gear 47 is provided between the countershaft 40 and the drive shaft 48.

An accommodating tube portion 14a that is dished toward the front side is provided integrally with the rear case 14. A clutch cover 50 is coupled to the rear case 14 so as to close the rear end opening of the accommodating tube portion 14a. The first and second hydraulic clutch devices 36, 37 are accommodated in a clutch chamber 51 formed between the rear case 14 and the clutch cover 50.

Between the first main shaft 38 and the countershaft 40, the sixth-speed gear train G6, the fourth-speed gear train G4, and the second-speed gear train G2 are provided so as to be arranged side by side in order from the side of the first and second hydraulic clutch devices 36, 37. The sixth-speed gear train G6 includes a sixth-speed driving gear 52 that is supported on the first main shaft 38 in a relatively rotatable manner, and a sixth-speed driven gear 53 that is provided integrally with the countershaft 40 and meshes with the sixth-speed driving gear 52. The fourth-speed gear train G4 includes a fourth-speed driving gear 54 that is supported on the first main shaft 38 in an axially movable and relatively non-rotatable manner, and a fourth-speed driven gear 55 that is supported on the countershaft 40 in a relatively rotatable manner and meshes with the fourth-speed driving gear 54. The second-speed gear train G2 includes a second-speed driving gear 56 that is supported on the first main shaft 38 in a relatively rotatable manner, and a second-speed driven gear 57 that is supported on the countershaft 40 in an axially movable and relatively non-rotatable manner and meshes with the second-speed driving gear 56.

Between the projecting portion of the second main shaft 39 from one end of the first main shaft 38, and the countershaft 40, the third-speed gear train G3, the fifth-speed gear train G5, and the first-speed gear train G1 are provided so as to be arranged side by side in order from the side of the first and second hydraulic clutch devices 36, 37. The third-speed gear train G3 includes a third-speed driving gear 58 that is supported on the second main shaft 39 in an axially movable and relatively non-rotatable manner, and a third-speed driven gear 59 that is supported on the countershaft 40 in a relatively rotatable manner and meshes with the third-speed driving gear 58. The fifth-speed gear train G5 includes a fifth-speed driving gear 60 that is supported on the second main shaft 39 in a relatively rotatable manner, and a fifth-speed driven gear 61 that is supported on the countershaft 40 in an axially movable and relatively non-rotatable manner and meshes with the fifth-speed driving gear 60. The first-speed gear train G1 includes a first-speed driving gear 62 that is coupled to the second main shaft 39 in a relatively non-rotatable manner, and a first-speed driven gear 63 that is supported on the countershaft 40 in a relatively rotatable manner and meshes with the first-speed driving gear 62.

Between the sixth-speed driving gear 52 and the second-speed driving gear 56, a first shifter 64 that enables switching between a state engaged with the sixth-speed driving gear 52, a state engaged with the second-speed driving gear 56, and a state not engaged with the sixth-speed driving gear 52 nor the second-speed driving gear 56 is supported on the first main shaft 38 in a relatively non-rotatable and axially movable manner. The fourth-speed driving gear 54 is provided integrally with the first shifter 64. Further, between the second-speed driving gear 56 and the fifth-speed driving gear 60, a second shifter 65 that enables switching between engagement with and disengagement from the fifth-speed driving gear 60 is supported on the second main shaft 39 in a relatively non-rotatable and axially movable manner. The third-speed driving gear 58 is provided integrally with the second shifter 65.

Between the fourth-speed driving gear 55 and the third-speed driven gear 59, a third shifter 66 that enables switching between engagement with and disengagement from the fourth-speed driven gear 55 is supported on the countershaft 40 in a relatively non-rotatable and axially movable manner. The second-speed driven gear 57 is provided integrally with the third shifter 66. Further, between the third-speed driven gear 59 and the first-speed driven gear 63, a fourth shifter 67 that enables switching between a state engaged with the third-speed driven gear 59, a state engaged with the first-speed driven gear 63, and a state not engaged with the third-speed driven gear 59 nor the first-speed driven gear 63 is supported on the countershaft 40 in a relatively non-rotatable and axially movable manner. The fifth-speed driven gear 61 is provided integrally with the fourth shifter 67.

The first-speed gear train G1 is established by engaging the fourth shifter 67 with the first-speed driven gear 63, the second-speed gear train G2 is established by engaging the first shifter 64 with the second-speed driving gear 56 in a state with the third shifter 66 not engaged with the fourth-speed driven gear 55, the third-speed gear train G3 is established by engaging the fourth shifter 67 with the third-speed driven gear 59 in a state with the second shifter 65 not engaged with the fifth-speed driving gear 60, the fourth-speed gear train G4 is established by engaging the third shifter 66 with the fourth-speed driven gear 55 in a state with the first shifter 64 not engaged with the sixth-speed and second-speed driving gear 52 and 56, the fifth-speed gear train G5 is established by engaging the second shifter 65 with the fifth-speed driving gear 60 in a state with the fourth shiner 67 not engaged with the first-speed and third-speed driven gear 59 and 63, and the six-speed gear train G6 is established by engaging the first shifter 64 with the sixth-speed driving gear 52.

The first to fourth shifters 64 to 67 are rotatably held by first to fourth shift forks 68, 69, 70, 71. As the shift forks 68 to 71 are driven in the direction of the axes of both the main shafts 38, 39 and countershaft 40, the first to fourth shifters 64 to 67 are actuated in the axial direction.

Figure 3:
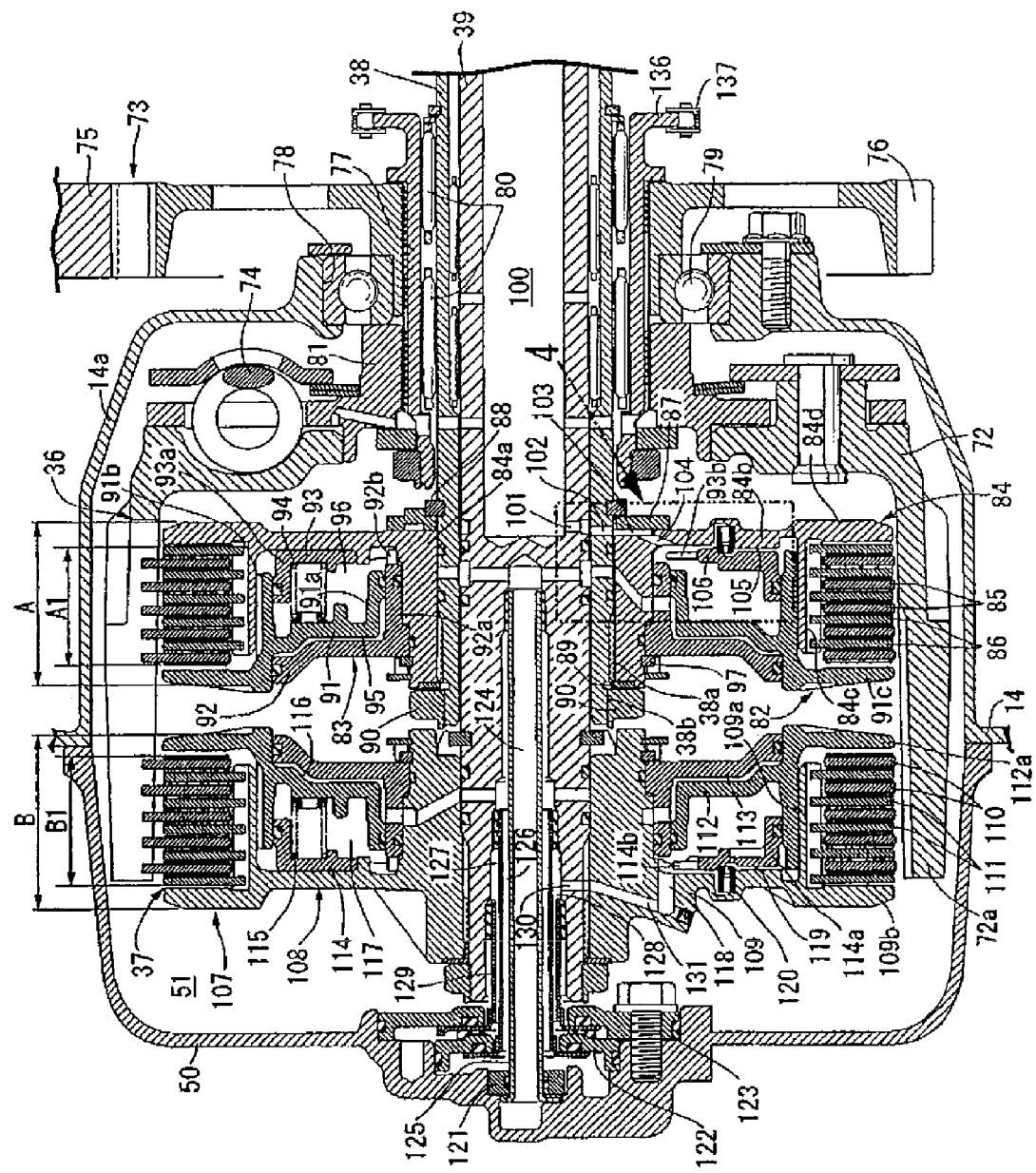
FIG. 3 is an enlarged main-portion view of FIG. 2.

Referring to FIG. 3 as well, the first hydraulic clutch device 36 is provided on the other end side of the first main shaft 38, and the second hydraulic clutch device 37 is provided on the other end side of the second main shaft 39. Power from the crankshaft 22 is inputted to a clutch outer 72 that is common to both the first and second hydraulic clutch devices 36, 37 via a primary reduction gearing 73 and a damper spring 74. The primary reduction gearing 73 includes a driving gear 75 provided to the crankshaft 22, and a driven gear 76 that meshes with the driving gear 75. The driven gear 76 is joined to the clutch outer 72 via the damper spring 74.

Provided at the front end of the accommodating tube portion 14a in the rear case 14 is a support hole 78 through which the first and second main shafts 38, 39 are coaxially inserted and through which a transmission tube shaft 77 coaxially surrounding the first main shaft 38 is inserted. A ball bearing 79 is interposed between the driven gear 76 coupled to the transmission tube shaft 77 in a relatively non-rotatable manner and the inner periphery of the support hole 78. Also, a plurality of needle bearings 80 are interposed between the transmission tube shaft 77 and the first main shaft 38. A transmission member 81 is coupled to the transmission tube shaft 77 in a relatively non-rotatable manner. The transmission member 81 is joined to the clutch outer 72 via the damper spring 74.

The first hydraulic clutch device 36 includes a first clutch actuation mechanism 82, and a first clutch disengage/engage control mechanism 83 for switching disengagement/engagement of the first clutch actuation mechanism 82. The first clutch actuation mechanism 82 includes the clutch outer 72 having a cylindrical portion 72a, a first clutch inner 84 that has a cylinder portion 84c coaxially surrounded by the cylindrical portion 72a of the clutch outer 72 and is coupled to the first main shaft 38 in a relatively non-rotatable manner, a plurality of first driving friction plates 85 as first friction plates that are engaged with the cylindrical portion 72a of the clutch outer 72 in a relatively non-rotatable manner, a plurality of first driven friction plates 86 as second friction plates that are engaged with the cylindrical portion 84c of the first clutch inner 84 in a relatively non-rotatable manner and arranged alternately with the first driving friction plates 85, a first bearing plate portion 84d that is opposed to the first driving and driven friction plates 85, 86 arranged in an alternately overlapping manner and is fixed to one of the first clutch inner 84 and the clutch outer 72 (the first clutch inner 84 in this embodiment), and a first pressing plate 91c that sandwiches the first driving and driven friction plates 85, 86 with the first bearing plate portion 84d.

The first clutch inner 84 integrally has a cylindrical boss portion 84a that is coupled to the first main shaft 38 in a relatively non-rotatable manner, a disc-shaped support plate portion 84b that juts out radially outward from one end of the boss portion 84a, the cylindrical portion 84c that is connected to the outer periphery of the support plate portion 84b and coaxially surrounds the boss portion 84a, and the first bearing plate portion 84d that juts out further radially outward from the outer periphery of the support plate portion 84b.

Provided coaxially on the other end side of the first main shaft 38 are a coupling shaft portion 38a, which has a spline groove formed in its outer periphery and is formed smaller in diameter than the first main shaft 38, and a screw shaft portion 38b on the distal end side, which has a male thread provided in its outer periphery and is formed smaller in diameter than the coupling shaft portion 38a. The inner periphery of the boss portion 84a in the first clutch inner 84 is provided with a spline groove that is fitted with the spline groove in the outer periphery on the other end side of the first main shaft 38. The boss portion 84a is coupled to the coupling shaft portion 38a in a relatively non-rotatable manner with its one end side fitted with the first main shaft 38. Further, one end of the boss portion 84a abuts on a ring-shaped nipping plate 87 that surrounds the first main shaft 38. A snap ring 88 for sandwiching the nipping plate 87 with the boss portion 84a is attached to the first main shaft 38. Further, a washer 89 abuts on the other end of the boss portion 84a. A bolt 90 that sandwiches the washer 89 with the boss portion 84a is brought into threaded engagement with the screw shaft portion 38b of the first main shaft 38. That is, the boss portion 84a of the first clutch inner 84 is spline-fitted to the first main shaft 38 from its other end side until the boss portion 84a abuts on the nipping plate 87, and by bringing the bolt 90 into threaded engagement with the screw shaft portion 38b for fastening so as to sandwich the washer 89 with the boss portion 84a, the first clutch inner 84 is coupled to the first main shaft 38 in a relatively non-rotatable manner and in a manner that allows relative axial movement.

As the first pressing plate portion 91c is actuated so as to sandwich the first driving and driven friction plates 85, 86 under pressure with the first bearing plate portion 84d, the first clutch actuation mechanism 82 is brought into a power transmission state for transmitting the power transmitted to the clutch outer 72 from the crankshaft 22 to the first main shaft 38.

The first clutch disengage/engage control mechanism 83 includes a first clutch piston 91 whose opposite sides are faced toward a first control hydraulic chamber 95 and a first hydraulic canceler chamber 96, a first end wall member 92 that forms the first control hydraulic chamber 95 between it and the first clutch piston 91 and is fixedly disposed to the first clutch inner 84, a first division wall member 93 that forms the first hydraulic canceler chamber 96 between it and the first clutch piston 91 and is arranged between the support plate portion 84b of the first clutch inner 84 and the first clutch piston 91, and a first return spring 94 that is accommodated in the first hydraulic canceler chamber 96 and provided under compression between the first clutch piston 91 and the first division wall member 93.

A cylindrical portion 92a that is fitted on the outer periphery of the boss portion 84a in the first clutch inner 84 is integrally provided with the inner periphery of the first end wall member 92. An engaging projection 92b is provided so as to project from one end of the cylindrical portion 92a. The engaging projection 92b engages with the proximal end of the support plate portion 84b in the first clutch inner 84 to thereby prevent the first end wall member 92 from rotating about the boss portion 84a. The first end wall member 92 is urged so as to separate from the first clutch piston 91 by the hydraulic pressure in the first control hydraulic chamber 95 formed between the first end wall member 92 and the first clutch piston 91. At this time, a snap ring 97 that abuts on the other end of the cylindrical portion 92a in the first end wall member 92 is attached to the outer periphery of the boss portion 84a in the first clutch inner 84 from the side opposite to the first control hydraulic chamber 95, thereby restricting movement of the first end wall member 92 in a direction away from the first clutch piston 91.

The first clutch piston 91 integrally has an inner tube portion 91a that coaxially surrounds the cylindrical portion 92a in the first end wall member 92 while being supported by the cylindrical portion 92a in a liquid-tight and slidable manner, and an outer tube portion 91b that coaxially surrounds the inner tube portion 91a so as to be inserted into the cylindrical portion 84c in the first clutch inner 84. The first pressing plate portion 91c is connected to the first clutch piston 91 so as to jut out radially outward from an end of the outer tube portion 91b. The outer periphery of the first end wall member 92 is fitted with the outer tube portion 91b in the first clutch piston 91 in a liquid-tight and relatively slidable manner.

In the first division wall member 93, a support tube portion 93a that is fitted with the outer tube portion 91b of the first clutch piston 91 in a liquid-tight manner and slidably supports the first clutch piston 91 is integrally provided so as to extend axially.

According to the first clutch disengage/engage control mechanism 83 as described above, as the first clutch piston 91 is actuated in accordance with an increase in hydraulic pressure of the first control hydraulic chamber 95, the first pressing plate portion 91c is actuated so as to sandwich the first driving and driven friction plates 85, 86 under pressure with the first bearing plate portion 84d, thereby bringing the first clutch actuation mechanism 82 into a power transmission state. Even when lubricating oil is filled in the first hydraulic canceler chamber 96, a centrifugal force due to rotation acts on the oil in the first control hydraulic chamber 95 under a decompressed state and a force for pressing the first clutch piston 91 is generated, a centrifugal force similarly acts on the lubricating oil in the first hydraulic canceler chamber 96 as well, thereby avoiding a situation where the first pressing plate portion 91c of the first clutch piston 91 is undesirably moved to the side for sandwiching the first driving and driven friction plates 85, 86 with the first bearing plate portion 84d.

Further, the first control hydraulic chamber 95, first hydraulic canceler chamber 96, and first division wall member 93 of the first clutch disengage/engage control mechanism 83 are arranged within a range A corresponding to the space between the outer surfaces (between surfaces on the side not facing the first driving and driven friction plates 85, 86) of the first bearing plate portion 84d and first pressing plate portion 91c of the first clutch actuation mechanism 92, desirably within a range A1 corresponding to the space between the opposite axial ends of the mutually overlapping first driving and driven friction plates 85, 86 of the first clutch actuation mechanism 82.

Figure 4:
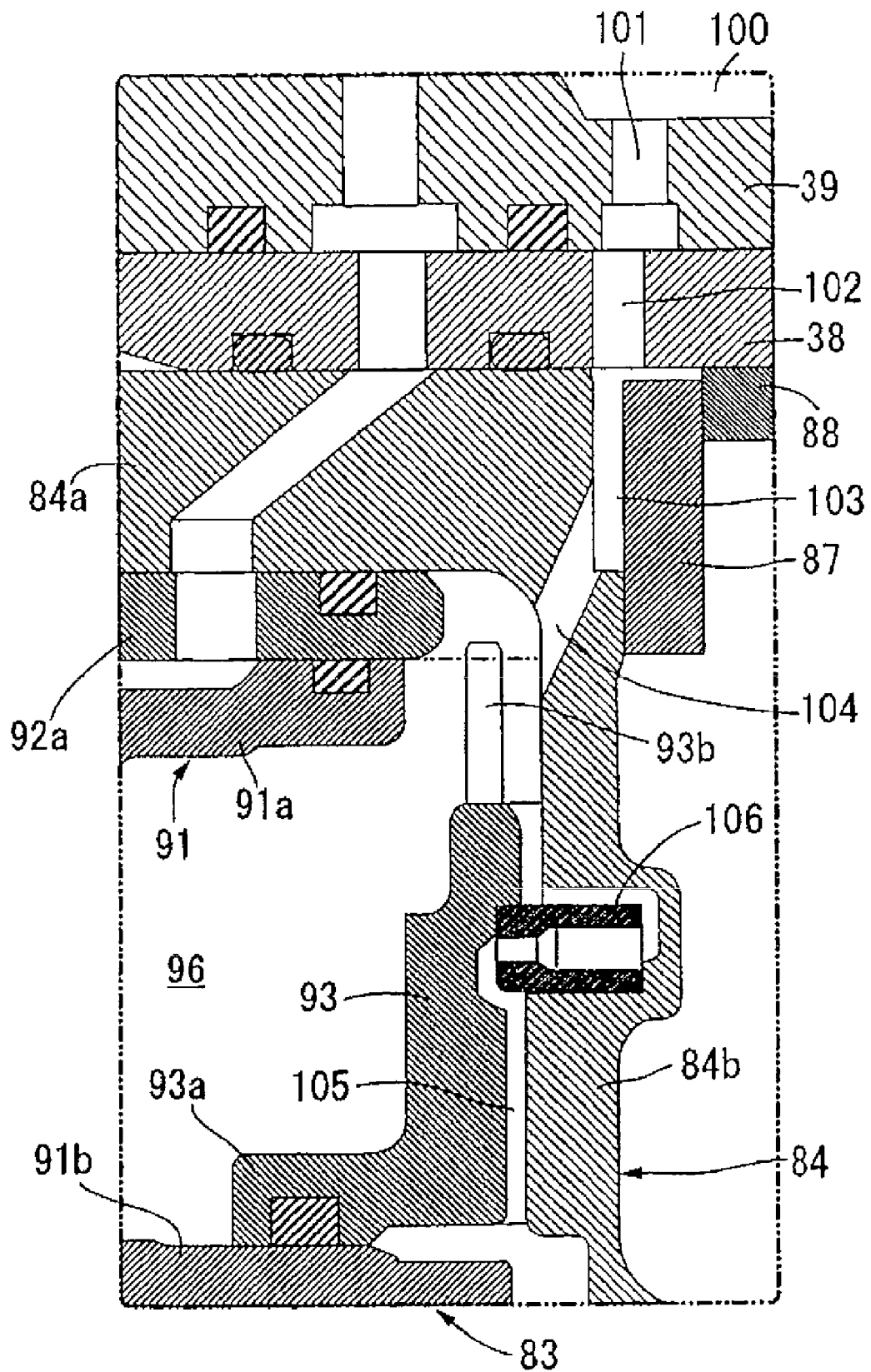
FIG. 4 is an enlarged view as seen along the arrow 4 of FIG. 3.

Referring to FIG. 4, a bottomed first oil passage 100 with its portion corresponding to the first hydraulic clutch device 36 serving as an inner end is coaxially provided in the second main shaft 39. Lubricating oil supplied to the first oil passage 100 is introduced in between the first and second main shafts 38, 39 and introduced to the first hydraulic canceler chamber 96 of the first clutch disengage/engage control mechanism 83 in the first hydraulic clutch device 36.

To introduce the lubricating oil in the first oil passage 100 to the first hydraulic canceler chamber 96, the second main shaft 39 is provided with a plurality of, for example, four oil holes 101 that communicate with the inner end of the first oil passage 100. Oil holes 102 communicating with the oil holes 101 are provided in the first main shaft 38. Oil passages 103 communicating with the oil holes 102 are formed between the boss portion 84a of the first clutch inner 84 and the nipping plate 87. In the connecting portion between the boss portion 84a and the support plate portion 84b in the first clutch inner 84, there are provided a plurality of, for example, four first lubricating-oil supply holes 104 that communicate with the oil passages 103 and open into the first hydraulic canceler chamber 96 at a position radially inward with respect to the inner peripheral edge of the first division wall member 93.

Between the support plate portion 84b in the first clutch inner 84 and first division wall member 93 of the first clutch disengage/engage control mechanism 83, there are formed a plurality of oil passages 105 that extend radially at portions corresponding to the lubricating-oil supply holes 104. The oil passages 105 are formed by grooves provided in the opposing surfaces of the support plate portion 84b and first division wall member 93. Lubricating oil introduced into each of the oil passages 105 is introduced toward the first driving and driven friction plates 85, 86 via the gap between the cylindrical portion 84c of the first clutch inner 84 and the outer tube portion 91b of the first clutch piston 91.

Further, in the intermediate portions of the respective oil passages 105 formed between the support plate portion 84b of the first clutch inner 84 and the first division wall member 93, first orifices 106 are interposed so as to be sandwiched between the support plate portion 84b and the first division wall member 93.

Figure 5:
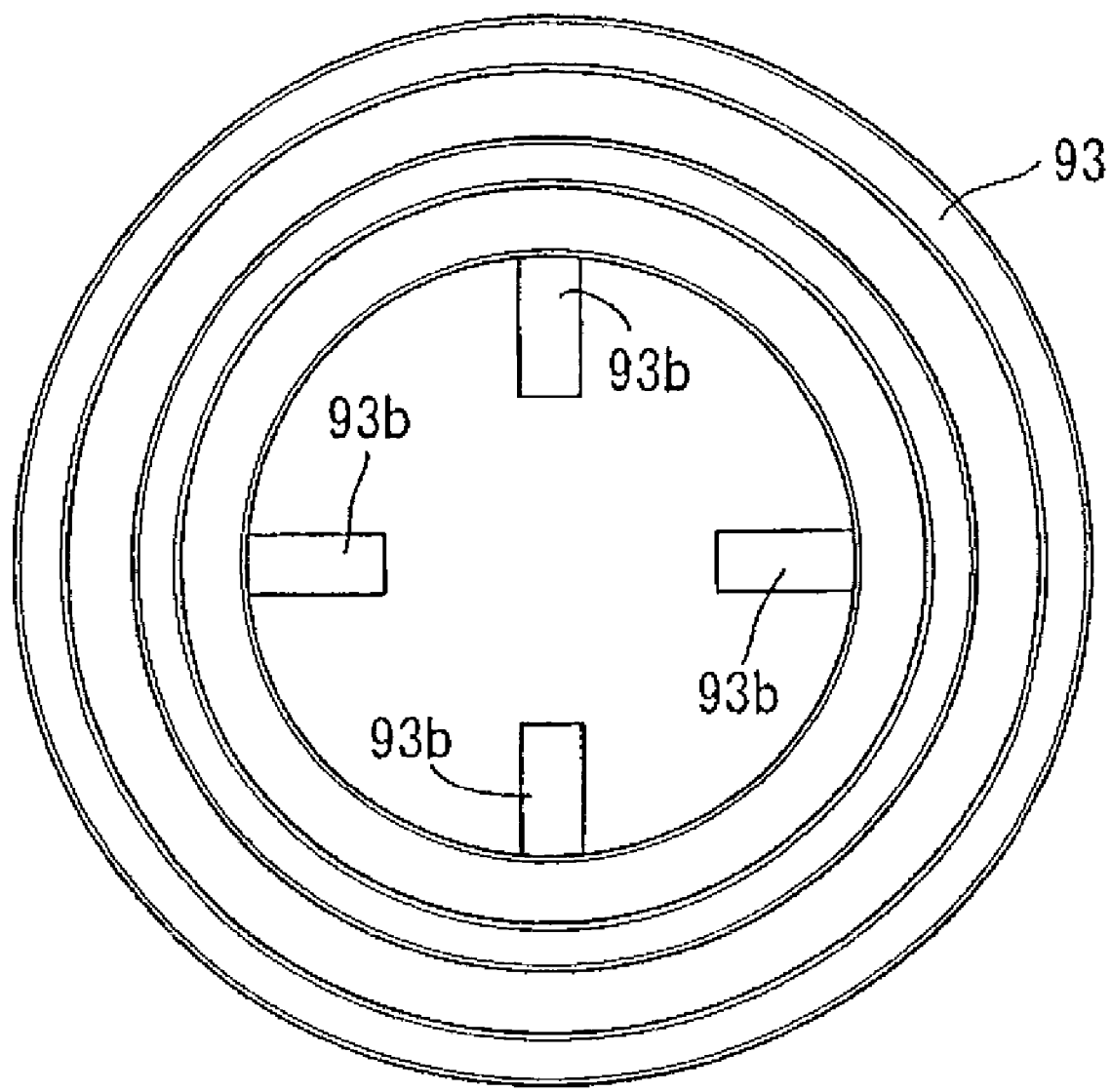
FIG. 5 is a view of a division wall portion as seen from the hydraulic canceler side.

As shown in FIG. 5, branch walls 93b that are at least partially opposed to the openings of the first lubricating-oil supply holes 104 leading to the first hydraulic canceler chamber 96 integrally project the inner periphery of the first division wall member 93 so as to introduce lubricating oil from the first lubricating-oil supply holes 104 toward the oil passages 105. The branch walls 93b extend radially inward from the inner periphery of the first division wall member 93 with their distal ends located radially inward with respect to the inner periphery of the first clutch piston 91. That is, the distal ends of the branch walls 93b are located radially inward with respect to an extended line (the chain line in FIG. 4) of the inner periphery of the first clutch piston 91.

Referring to FIG. 3 again, the second hydraulic clutch device 37 is arranged side by side with the first hydraulic clutch device 36 in a direction along the axis of the second main shaft 39 so as to sandwich the first hydraulic clutch device 36 with the primary reduction gearing 73. The second hydraulic clutch device 37 includes a second clutch actuation mechanism 107, and a second clutch disengage/engage control mechanism 108 for switching disengagement/engagement of the second clutch actuation mechanism 107.

The second clutch actuation mechanism 107 includes the clutch outer 72, a second clutch inner 109 that has a cylindrical portion 109a coaxially surrounded by the cylindrical portion 72a of the clutch outer 72 and is coupled to the second main shaft 39 in a relatively non-rotatable manner, a plurality of second driving friction plates 110 as first friction plates that are engaged with the cylindrical portion 72a of the clutch outer 72 in a relatively non-rotatable manner, a plurality of second driven friction plates 111 as second friction plates that are engaged with the cylindrical portion 109a of the second clutch inner 109 in a relatively non-rotatable manner and arranged alternately with the second driving friction plates 110, a second bearing plate portion 109b that is opposed to the second driving and driven friction plates 110, 111 arranged in an alternately overlapping manner and is provided integrally with the second clutch inner 109, and a second pressing plate 112a that sandwiches the second driving and driven friction plates 110, 111 with the second bearing plate portion 109b. The second clutch actuation mechanism 107 is of basically the same construction as the first clutch actuation mechanism 82, so detailed description thereof is omitted.

The second clutch disengage/engage control mechanism 108 includes a second clutch piston 112 whose opposite sides face towards a second control hydraulic chamber 116 and a second hydraulic canceler chamber 117 and to which the second pressing plate portion 112a is integrally connected, a second end wall member 113 that forms the second control hydraulic chamber 117 between it and the second clutch piston 112 and is fixedly disposed to the second clutch inner 109, a second division wall member 114 that is arranged between the second clutch inner 109 and the second clutch piston 112 so as to form the second hydraulic canceler chamber 117 between it and the second clutch piston 112, and integrally has a support tube portion 114a slidably supporting the second clutch piston 112, and a second return spring 115 that is accommodated in the second hydraulic canceler chamber 117 and provided under compression between the second clutch piston 112 and the second division wall member 114. The second clutch disengage/engage control mechanism 108 is of basically the same construction as the first clutch disengage/engage control mechanism 83, so detailed description thereof is omitted.

Further, the second control hydraulic chamber 116, second hydraulic canceler chamber 117, and second division wall member 114 of the second clutch disengage/engage control mechanism 108 are arranged within a range B corresponding to the space between the outer surfaces of the second bearing plate portion 109b and second pressing plate portion 112a of the second clutch actuation mechanism 107, desirably within a range B1 corresponding to the space between the opposite axial ends of the mutually overlapping second driving and driven friction plates 110, 111 of the second clutch actuation mechanism 107.

The second clutch inner 109 is provided with a plurality of lubricating-oil supply holes 118 that open into the second hydraulic canceler chamber 117 at a position radially inward with respect to the inner peripheral edge of the second division wall member 114. Between the second clutch inner 109 and the second division wall member 114, there are formed a plurality of oil passages 119 that extend radially at portions corresponding to the second lubricating-oil supply holes 118. Lubricating oil introduced into each of the oil passages 119 is introduced toward the second driving and driven friction plates 110, 111 via the gap between the second clutch inner 109 and the second clutch piston 112.

Further, in the intermediate portions of the respective oil passages 119 formed between the second clutch inner 109 and the second division wall member 114, second orifices 120 are interposed so as to be sandwiched between the second clutch inner 109 and the second division wall member 114.

Branch walls 114b that are at least partially opposed to the openings of the second lubricating-oil supply holes 118 leading to the second hydraulic canceler chamber 117 integrally project the inner periphery of the second division wall member 114 so as to introduce lubricating oil from the second lubricating-oil supply holes 118 toward the oil passages 119. The branch walls 114b extend radially inward from the inner periphery of the second division wall member 114 with their distal ends located radially inward with respect to the inner periphery of the second clutch piston 112.

First, second, and third partition members 121, 122, 123 are mounted on the inner surface side of the clutch cover 50. Between the second main shaft 39 and the first partition member 121, there is provided a first tube member 125 that forms a first control oil passage 124 communicating with the first control hydraulic chamber 95 of the first hydraulic clutch device 36. Between the second main shaft 39 and the second partition member 122, there is provided a second tube member 127 that forms an annular second control oil passage 126, which communicates with the second control hydraulic chamber 116 of the second hydraulic clutch device 37, between it and the first tube member 125 and coaxially surrounds the first tube member 125.

Between the second main shaft 39 and the third partition member 123, there is provided a third tube member 129 that forms an annular second oil passage 128 between it and the second tube member 127 and coaxially surrounds the second tube member 127. A plurality of oil holes 130 communicating with the second oil passage 128 are provided in the second main shaft 39. A plurality of oil holes 131 for establishing communication between the oil holes 130 and the second lubricating-oil supply holes 118 are provided in the second clutch inner 109 of the second hydraulic clutch device 37.

The first and second control oil passages 124, 126 are connected to a clutch actuator 132 (see FIG. 1). Disengagement/engagement of the first and second hydraulic clutch devices 36, 37 is switched by controlling the hydraulic pressures in the first and second control oil passages 124, 126, that is, the first and second control hydraulic chambers 95, 116 by the clutch actuator 132.

The clutch actuator 132 includes a first electromagnetic control valve 133 for switching application/release of hydraulic pressure on the first control hydraulic chamber 95 in the first hydraulic clutch device 36, and a second electromagnetic control valve 134 for switching application/release of hydraulic pressure on the second control hydraulic chamber 116 in the second hydraulic clutch device 37.

As shown in FIG. 1, an oil pump 135 is accommodated in a lower portion within the crankcase 21. Power is transmitted to the oil pump 135 by means of a drive sprocket 136 (see FIGS. 2 and 3) that is provided integrally with the transmission tube shaft 77 to which power from the crankshaft 22 is transmitted via the primary reduction gearing 73, a driven sprocket (not shown) provided to a pump shaft 138 of the oil pump 135, and an endless chain 137 wound around the drive sprocket 136 and the driven sprocket.

Oil discharged from the oil pump 135 is introduced toward the first and second electromagnetic control valves 133, 134 via an oil filter 139 provided to the clutch cover 50.

A description will be given of operation according to this embodiment, wherein the first/second hydraulic clutch device 36, 37, the control hydraulic chamber 95, 116, hydraulic canceler chamber 96, 117, and division wall member 93, 114 of the first/second clutch disengage/engage control mechanism 83, 108 are arranged within the range A, B corresponding to the space between the outer surfaces of the first/second bearing plate portion 84d, 109b and first/second pressing plate portion 91c, 112a in the first/second clutch actuation mechanism 82, 107 and radially inward of the first/second clutch actuation mechanism 82, 107. Therefore, by arranging a large portion of the first/second clutch disengage/engage control mechanism 83, 108 radially inward of the first/second clutch actuation mechanism 82, 107, the axial size of the first/second hydraulic clutch device 36, 37 can be reduced. Further, the control hydraulic chamber 95, 116, the hydraulic canceler chamber 96, 117, and the division wall member 93, 114 are arranged within the range A1, B1 of the first/second clutch actuation mechanism 82, 107 corresponding to the space between the opposite axial ends of the first driving and driven friction plates 85, 86/second driving and driven friction plates 110, 111, thereby achieving a further reduction in the axial size of the first/second hydraulic clutch device 36, 37.

Further, in the first/second clutch disengage/engage control mechanism 83, 108, the return spring 94, 115 exerts a spring force on the first/second clutch piston 91, 112 in a direction for actuating the first/second clutch actuation mechanism 82, 107 to the a disengagement side and presses the first/second division wall member 93, 114 onto the first/second clutch inner 84, 109. The return spring 94, 115 is accommodated in the first/second hydraulic canceler chamber 96, 117 and provided between the first/second clutch piston 91, 112 and the first/second division wall member 93, 114. Therefore, the first/second division wall member 93, 114 can be substantially fixed to the first/second clutch inner 84, 109 as the first/second division wall member 93, 114 is pressed onto the first/second clutch inner 84, 109 by the first/second return spring 94, 115. It is thus possible to reduce the number of parts by obviating a dedicated member for fixing the first/second division wall member 93, 114 to the first/second clutch inner 84, 109, which in turn contributes to a reduction in the size of the first/second hydraulic clutch device 36, 37.

In the first/second division wall member 93, 114, the support tube portion 93a, 114a that extends axially is integrally provided so as to support the first/second clutch piston 91, 112 in a liquid-tight and slidable manner. Accordingly, even when a sufficiently large sliding area of the first/second clutch piston 91, 112 with the support tube portion 93a, 14a is secured to provide sufficient support for the first/second clutch piston 91, 112, since the first/second division wall member 93, 114 is arranged within the range A, B corresponding to the space between the outer surfaces of the first/second bearing plate portion 84d, 109b and first/second pressing plate portion 91c, 112a in the first/second clutch actuation mechanism 82, 107 and radially inward of the first/second clutch actuation mechanism 82, 107, it is possible to suppress an increase in the axial size of the first/second hydraulic clutch device 36, 37.

The oil passages 105, 119 for introducing lubricating oil toward the first driving and driven friction plates 85, 86/second driving and driven friction plates 110, 111 are formed between the first/second clutch inner 84, 109 and the first/second division wall member 93, 114. In this regard, since the orifices 106, 120 are interposed in the oil passages 105, 109, it is possible to prevent an excessive amount of lubricating oil from being introduced toward the first driving and driven friction plates 85, 86/second driving and driven friction plates 110, 111, thereby introducing an appropriate amount of lubricating oil toward the first driving and driven friction plates 85, 86/second driving and driven friction plates 110, 111.

Further, the first/second lubricating-oil supply holes 104, 118 that open into the first/second hydraulic canceler chamber 96, 117 at positions radially inward with respect to an inner peripheral edge of the first/second division wall member 93, 114 are provided in the first/second clutch inner 84, 109, and the branch walls 93b, 114b that are at least partially opposed to the openings of the first/second lubricating-oil supply holes 104, 118 integrally project from an inner periphery of the first/second division wall member 93, 114 so as to introduce lubricating oil from the first/second lubricating-oil supply holes 104, 118 toward the oil passages 105, 119. Accordingly, it is possible to reduce the number of machining processes by causing lubricating oil to be commonly supplied to the first/second hydraulic canceler chamber 96, 117 and to the oil passages 105, 119, while positively allowing the lubricating oil to flow toward the oil passages 105, 119 by means of the branch walls 93b, 114b.

Further, since the distal ends of the branch walls 93b, 114b are located radially inward with respect to the inner periphery of the first/second clutch piston 91, 112, lubricating oil can be diverted toward the oil passages 105, 109 at a position not susceptible to the influence of the sliding operation of the first/second clutch piston 91, 112.

While an embodiment of the present invention has been described above, the present invention is not limited to the above-mentioned embodiment, and various design modifications are possible without departing from the scope of the present invention as defined in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic clutch device comprising:
a clutch actuation mechanism having a clutch outer;
a clutch inner coaxially surrounded by the clutch outer;
a plurality of first friction plates engaged with the clutch outer in a relatively non-rotatable manner;
a plurality of second friction plates that are arranged so as to alternately overlap with the first friction plates and engaged with the clutch inner in a relatively non-rotatable manner;
a bearing plate portion that is fixed to one of the clutch inner and the clutch outer so as to be opposed to the first and second friction plates arranged in a mutually overlapping manner and a pressing plate portion that sandwiches the first and second friction plates with the bearing plate portion; and
a clutch disengage/engage control mechanism for switching disengagement/engagement of the clutch actuation mechanism,
the clutch disengage/engage control mechanism including:
a clutch piston whose opposite sides are faced toward a control hydraulic chamber and a hydraulic canceler chamber and which is connected to the pressing plate portion so as to move to a side for pressing the first and second friction plates in accordance with an increase in hydraulic pressure of the control hydraulic chamber, and
a division wall member disposed between the clutch piston and the bearing plate portion that forms the hydraulic canceler chamber between one side of the division wall member and the clutch piston, and forms an oil passage between an opposite side of the division wall member and the bearing plate portion, which introduces lubricating oil toward the first and second friction plates, in cooperation with the clutch inner;

wherein the control hydraulic chamber, the hydraulic canceler chamber and the division wall member of the clutch disengage/engage control mechanism are arranged within a range corresponding to a space between outer surfaces of the bearing plate portion and the pressing plate portion, and radially inward of the clutch actuation mechanism.

2. The hydraulic clutch device according to claim 1, wherein the control hydraulic chamber, the hydraulic canceler chamber and the division wall member are arranged within a range of the clutch actuation mechanism corresponding to a space between opposite axial ends of the plurality of first and second friction plates arranged in a mutually overlapping manner.

3. The hydraulic clutch device according to claim 2, wherein a return spring that exerts a spring force on the clutch piston in a direction for actuating the clutch actuation mechanism to a disengagement side, and presses the division wall member onto the clutch inner is accommodated in the hydraulic canceler chamber and is provided between the clutch piston and the division wall member.

4. The hydraulic clutch device according to claim 3, wherein a support tube portion extends axially and is integrally provided in the division wall member so as to support the clutch piston in a liquid-tight and slidable manner.

5. The hydraulic clutch device according to claim 3, wherein an orifice is interposed in the oil passage.

6. The hydraulic clutch device according to claim 3, wherein a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

7. The hydraulic clutch device according to claim 2, wherein a support tube portion extends axially and is integrally provided in the division wall member so as to support the clutch piston in a liquid-tight and slidable manner.

8. The hydraulic clutch device according to claim 2, wherein an orifice is interposed in the oil passage.

9. The hydraulic clutch device according to claim 2, wherein a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

10. The hydraulic clutch device according to claim 1, wherein a support tube portion extends axially and is integrally provided in the division wall member so as to support the clutch piston in a liquid-tight and slidable manner.

11. The hydraulic clutch device according to claim 10, wherein an orifice is interposed in the oil passage.

12. The hydraulic clutch device according to claim 10, wherein a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

13. The hydraulic clutch device according to claim 1, wherein an orifice is interposed in the oil passage.

14. The hydraulic clutch device according to claim 1, wherein a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

15. The hydraulic clutch device according to claim 14, wherein the branch wall extends from the inner periphery of the division wall member with its distal end located radially inward with respect to the clutch piston.

16. A hydraulic clutch device, comprising:
a clutch actuation mechanism having a clutch outer;
a clutch inner coaxially surrounded by the clutch outer;
a plurality of first friction plates engagable with the clutch outer in a relatively non-rotatable manner;
a plurality of second friction plates arranged to alternately overlap with the first friction plates and engagable with the clutch inner in a relatively non-rotatable manner;
a bearing plate portion fixed to one of the clutch inner and the clutch outer to be opposed to the first and second friction plates arranged in a mutually overlapping manner and a pressing plate portion that sandwiches the first and second friction plates with the bearing plate portion;
a clutch disengage/engage control mechanism for switching disengagement/engagement of the clutch actuation mechanism; and
a clutch piston operatively forming a part of the clutch disengage/engage control mechanism, said clutch piston having opposite sides facing toward a control hydraulic chamber and a hydraulic canceler chamber and which is connected to the pressing plate portion so as to move to a side for pressing the first and second friction plates in accordance with an increase in hydraulic pressure of the control hydraulic chamber and a division wall member forming the hydraulic canceler chamber between the division wall member and the clutch piston and forming an oil passage, for introducing lubricating oil toward the first and second friction plates, in cooperation with the clutch inner;
said control hydraulic chamber, the hydraulic canceler chamber and the division wall member of the clutch disengage/engage control mechanism being arranged within a range corresponding to a space between outer surfaces of the bearing plate portion and the pressing plate portion and radially inward of the clutch actuation mechanism,
wherein a lubricating-oil supply hole that opens into the hydraulic canceler chamber at a position radially inward with respect to an inner peripheral edge of the division wall member is provided in the clutch inner, and a branch wall at least a part of which is opposed to an opening of the lubricating-oil supply hole integrally projects from an inner periphery of the division wall member so as to introduce lubricating oil from the lubricating-oil supply hole toward the oil passage.

17. A hydraulic clutch device comprising:
a clutch actuation mechanism having a clutch outer;
a clutch inner coaxially surrounded by the clutch outer;
a plurality of first friction plates engagable with the clutch outer in a relatively non-rotatable manner;

a plurality of second friction plates arranged to alternately overlap with the first friction plates and engagable with the clutch inner in a relatively non-rotatable manner;

a bearing plate portion fixed to one of the clutch inner and the clutch outer to be opposed to the first and second friction plates arranged in a mutually overlapping manner and a pressing plate portion that sandwiches the first and second friction plates with the bearing plate portion;

a clutch disengage/engage control mechanism for switching disengagement/engagement of the clutch actuation mechanism; and a clutch piston operatively forming a part of the clutch disengage/engage control mechanism, said clutch piston having opposite sides facing toward a control hydraulic chamber and a hydraulic canceler chamber and which is connected to the pressing plate portion so as to move to a side for pressing the first and second friction plates in accordance with an increase in hydraulic pressure of the control hydraulic chamber, and a division wall member disposed between the clutch piston and the bearing plate portion forming the hydraulic canceler chamber between one side of the division wall member and the clutch piston and forming an oil passage between an opposite side of the division wall member and the bearing plate portion, for introducing lubricating oil toward the first and second friction plates, in cooperation with the clutch inner;

said control hydraulic chamber, the hydraulic canceler chamber and the division wall member of the clutch disengage/engage control mechanism being arranged within a range corresponding to a space between outer surfaces of the bearing plate portion and the pressing plate portion and radially inward of the clutch actuation mechanism.

18. The hydraulic clutch device according to claim 17, wherein the control hydraulic chamber, the hydraulic canceler chamber and the division wall member are arranged within a range of the clutch actuation mechanism corresponding to a space between opposite axial ends of the plurality of first and second friction plates arranged in a mutually overlapping manner.

19. The hydraulic clutch device according to claim 18, wherein a return spring for exerting a spring force on the clutch piston in a direction for actuating the clutch actuation mechanism to a disengagement side, and for pressing the division wall member onto the clutch inner is accommodated in the hydraulic canceler chamber and is provided between the clutch piston and the division wall member.

20. The hydraulic clutch device according to claim 17, wherein a support tube portion extends axially and is integrally provided in the division wall member so as to support the clutch piston in a liquid-tight and slidable manner.

* * * * *

UNITED STATES PATENT AND TRADEMARK OFFICE
CERTIFICATE OF CORRECTION

| | | |
|---|---|---|
| PATENT NO. | : 7,921,975 B2 | |
| APPLICATION NO. | : 12/109070 | |
| DATED | : April 12, 2011 | |
| INVENTOR(S) | : Atsushi Ogasawara et al. | |

It is certified that error appears in the above-identified patent and that said Letters Patent is hereby corrected as shown below:

ON THE TITLE PAGE:

At item (75), Inventors, change the name of the second-named inventor from "Yoshinki Tsukada, Saitama (JP)" to --Yoshiaki Tsukada, Saitama (JP)--.

Signed and Sealed this
Twenty-third Day of August, 2011

David J. Kappos
*Director of the United States Patent and Trademark Office*